United States Patent
Knutson et al.

[15] 3,674,313
[45] July 4, 1972

[54] METHOD FOR EFFECTING DIRECTIONAL NUCLEAR FRACTURING

[72] Inventors: Carroll F. Knutson; Charles Robert Boardman, both of P.O. Box 15090, Las Vegas, Nev. 89114

[22] Filed: April 17, 1970

[21] Appl. No.: 29,590

[52] U.S. Cl. .................................299/13, 102/21, 102/23, 166/247
[51] Int. Cl. ........................................E21b 43/26
[58] Field of Search ...............299/4, 5, 13; 166/245, 247; 102/20, 21, 23

[56] References Cited
UNITED STATES PATENTS 3,464,490  9/1969  Silverman..............................166/245
3,533,471  10/1970  Robinson...............................102/21 X

*Primary Examiner*—Ernest R. Purser
*Attorney*—David Paul Cullen and William R. Laney

[57] ABSTRACT

A method for localizing and directing energy from an underground nuclear explosion which includes the steps of providing an acoustical blocking zone on at least one side of the contemplated explosion situs to limit transmission of elastic waves to the earth on the opposite sides of the acoustical blocking zone, then detonating the nuclear explosive at the situs. The acoustical blocking zone is a zone of material which is at variance in its acoustical characteristics with respect to the adjacent earth in which it is located.

5 Claims, 4 Drawing Figures

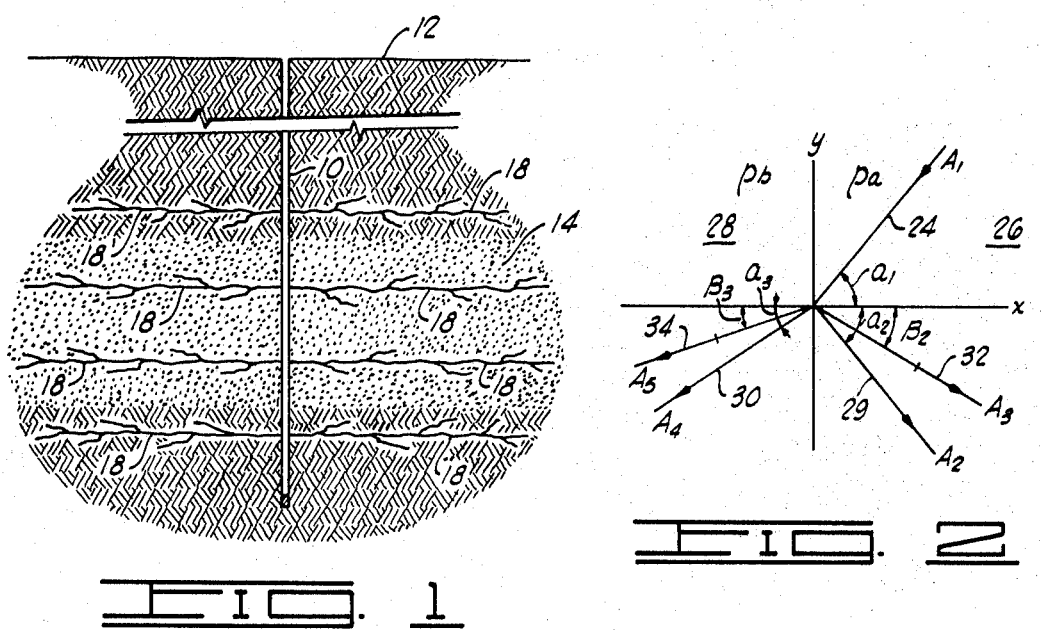
FIG. 1
FIG. 2
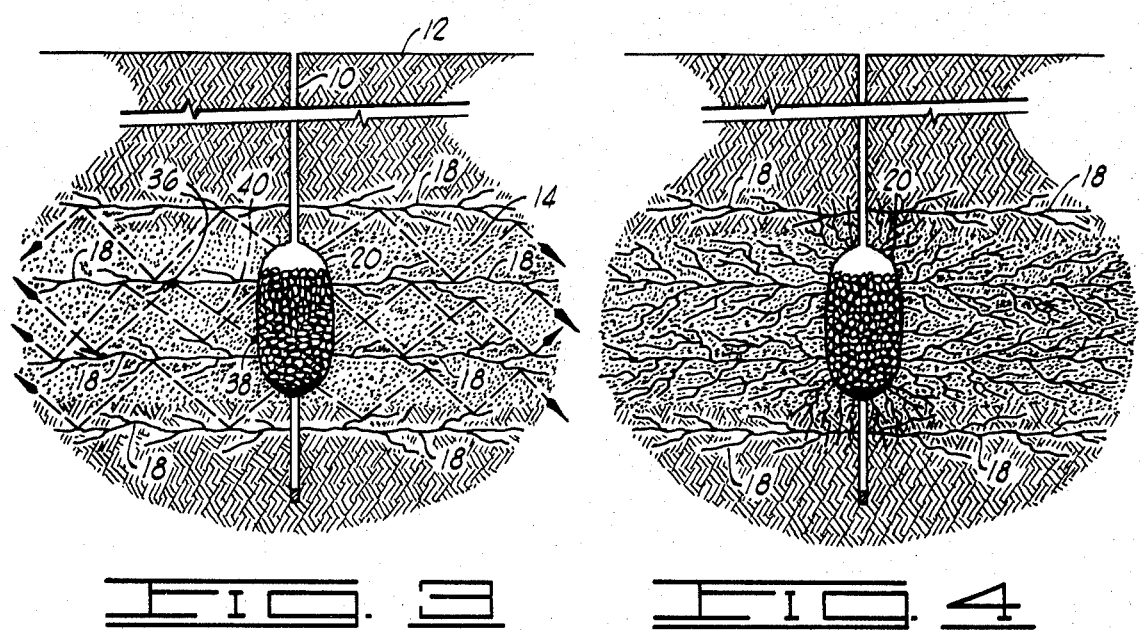
FIG. 3
FIG. 4
INVENTORS.
CHARLES R. BOARDMAN &
CARROLL F. KNUTSON
BY
ATTORNEY

METHOD FOR EFFECTING DIRECTIONAL NUCLEAR FRACTURING

BACKGROUND OF THE INVENTION

This invention relates to subterranean nuclear fracturing, and more particularly, to methods of optimizing subterranean nuclear fracturing by concentrating and directing the energy released from a nuclear explosion in a subterranean situs.

BRIEF DESCRIPTION OF THE PRIOR ART

In testing and utilizing nuclear devices for peaceful purposes, such devices are frequently detonated in a subterranean environment. One example of utilization in this environment is the fracturing of large volumes of subterranean formations for the purpose of producing hydrocarbons therefrom. In this and a majority of instances of subterranean detonation of nuclear devices, there are two desiderata that tend to be mutually exclusive of each other in present practice. One of these is the frequent desirability of using the largest (highest yield) nuclear device which is practical—particularly for the purpose of reducing the ratio of device emplacement cost to the amount of energy released. The other desideratum is that of minimizing seismic effects at the surface which, of course, becomes more difficult as the size of the device is increased.

To obviate the obviously countermanding character of the two objectives, a method by which the released energy is localized or at least diverted to some extent away from the surface is suggested. In a broader sense, there is suggested the desirability of focusing or channeling the energy released by the explosion so that it is propagated in a desired and controlled direction—in the majority of instances, horizontally rather than vertically. Such directional concentration of explosive-released energy has been accomplished with conventional high explosives, as evidenced by such practical manifestations of the accomplishment as armor-piercing rockets and directional blasting.

It is not feasible, however, to use the same techniques and structures for controlling the direction of propagation of energy released from nuclear devices as are used with conventional high explosives. For example, the overwhelming energy released from an uncontrolled nuclear reaction is such as to render useless the specialized structural geometry of the explosive casing which is commonly used to focus chemical explosive energy. The technology of subterranean nuclear detonations is thus not presently the beneficiary of any effective method of focusing or directing the released energy in the manner described.

BRIEF DESCRIPTION OF THE PRESENT INVENTION

This invention provides a method for controlling the direction of propagation of energy released by a subterranean nuclear explosion. In a specific, though non-limiting, application of the invention, acoustic energy from the explosion is channeled in a horizontal direction to minimize seismic effects at the surface, and increase the extent of horizontal fracturing in the environment of the explosion.

Broadly described, the method of the invention comprises the steps of providing one or more acoustical barriers or blocking zones in spaced relation to the situs at which the nuclear device is to be located at the time of detonation, and between this situs and a location which it is desired to shield from released acoustical energy; then detonating the nuclear device. The acoustical barriers or blocking zones are formed by emplacing material in the earth which is different in its acoustical properties from the earth between it and the explosive situs—or stated differently, is acoustically mismatched with respect to this earth.

In a more specific aspect, one embodiment of the method of the invention comprises initially drilling a bore hole from the surface of the earth to below the depth of the explosion situs, then extending horizontal fractures from this hole out into the earth at locations above and below the explosion situs. These fractures are filled with a material which will provide the maximum acoustical mismatch with the earth in which the fractures are located. The nuclear device is then detonated at the explosion situs between the acoustical blocks formed by the filled fractures.

An important object of the invention is to provide a method of controlling the direction in which energy released by a subterranean nuclear explosion is propagated through the earth.

Another and more specific object of the invention is to minimize at the surface of the earth, seismic effects resulting from the subterranean detonation of a nuclear explosive.

A further object of the invention is to maximize the extent and effectiveness of horizontal fracturing which results directly from the detonation of a nuclear device in a subterranean location.

Other objects and advantages of the invention will become apparent as the following detailed description of the invention is read in conjunction with the accompanying drawings which illustrate the invention.

BRIEF DESCRIPTION OF THE DRAWINGS

FIG. 1 is a vertical sectional view through the earth showing a subterranean formation into which a vertical bore hole has been extended, and into which a plurality of vertically spaced fractures have been horizontally extended.

FIG. 2 is a diagram illustrating the effect of impingement of a dilational elastic wave upon an interface between two media of differing acoustical properties.

FIG. 3 is a view similar to FIG. 1, but modified to illustrate the development of a chimney between horizontal fractures as the result of a nuclear explosion, and showing by dashed lines the manner in which acoustic waves from the explosion tend to be channeled by the acoustical blocks effectively formed by the fractures and the material contained therein.

FIG. 4 is a view similar to FIGS. 1 and 3, but showing schematically the extent of nuclear fracturing experienced when utilizing the present invention.

DETAILED DESCRIPTION OF PREFERRED EMBODIMENTS OF THE PRESENT INVENTION

Referring initially to FIG. 1, shown therein is a vertically sectioned portion of the earth into which a well bore 10 has been drilled from the surface 12. The bore hole 10 extends vertically downwardly through a stratum, such as a hydrocarbon bearing stratum 14, from which it is desired to produce hydrocarbons. Typically, the stratum may be an oil shale. The bore hole 10 preferably extends to a vertical level below the stratum 14. In accordance with techniques well known and understood in the oil and gas production industry, such as notching or shooting, a plurality of horizontally extending fractures 18 have been extended horizontally outwardly from the bore hole 10 at vertically spaced intervals therealong. The fractures 18 are extended a substantial distance in a horizontal direction, and are vertically spaced from each other by distances which may vary from 50 feet upwardly. The uppermost fracture is preferably spaced from the lowermost fracture by a distance which is greater than the vertical extent of a cavity and chimney which are to be formed as the result of detonation of a nuclear device at a point within the bore hole 10 where it traverses the stratum 14 as hereinafter explained. This vertical dimension may vary from about 250 feet to about 1,000 feet, depending upon the size of the nuclear device which is to be detonated.

The fractures 18 are preferably generally pancake shaped in configuration, and extend radially outwardly from the bore hole 10 by a distance which is at least twice, and most preferably, at least three times, the radius of the cavity formed by the detonation of a nuclear device as hereinafter described. In order to form an effective acoustical block, it is also desirable that the fractures 18 be of sufficient width to accommodate a packing or filling material of a type hereinafter described so that this material has a thickness in the fractures of at least one-sixteenth inch, and preferably at least one-fourth inch.

After the formation of the fractures 18 at the described locations, the fractures are filled, or propped, with a material which will provide a maximum acoustical mismatch with the earth in the adjacent stratum 14, or in that portion of the subterranean environment in which the fracture is located. By acoustical mismatch is meant a material which differs in its characteristic impedance to acoustic or elastic waves from the characteristic impedance of the adjacent earth. This characteristic impedance is the product of the density of the medium and the velocity of propagation of an elastic wave therethrough.

In selecting the material which is to be emplaced in the fractures to form the acoustic barriers or zones which have heretofore been generally referenced, it is desirable that the difference in the characteristic impedances of the fracture packing material and the surrounding earth be maximized. Although generalizations will not hold true for all types of subterranean environments, materials which are generally suitable for the purpose of emplacement in the fractures include sand-water slurries, walnut hulls, asphalt, gilsonite slurry, or light weight cement. As an example of the type of selection made, where the formation into which the fracture extends is a limestone or dolomite formation and thus has a characteristic impedance of 600,000 gm/cm²sec and above, a packing material having a characteristic impedance below this value should be utilized. The purpose in providing the acoustical mismatch at the locations of the fractures will be hereinafter described in greater detail.

After the fractures have been packed with a material selected to provide the maximum acoustic mismatch with the soil or rocks on opposite sides of each fracture, a nuclear device is lowered in the bore hole 10 on a suitable suspension cable until it reaches the situs at which it is planned to explode the device. This situs will be selected in accordance with presently known techniques to provide disintegration and fracturing of a substantial portion of the hydrocarbon bearing stratum 14 adjacent the bore hole 10. Also, the selected situs for detonation of the nuclear device is such that the stratum 14 will be fractured over a large radial extent in a horizontal direction by the energy released when the device is detonated. When the device is emplaced in the manner described, it is detonated by the use of a detonation cable extended from the surface through the well bore 10. The resulting explosion creates a very large cavity which collapses to form chimney 20 (see FIG. 3) and expanding shock waves of high energy are produced. The strong shock waves are propagated outwardly in the formation of supersonic velocity. The amplitude and propagation velocity of the shock waves attenuate rapidly with distance, and at a distance of several cavity radii, these waves degenerate into elastic sound waves. It is for the purpose of focusing or directionally controlling these waves that the present invention is utilized.

It will be helpful in understanding the present invention to consider the theoretical basis which underlies the invention. In FIG. 2, there is diagrammatically illustrated, the effect of impingement of a dilational or longitudinal elastic wave upon an interface between two media of different characteristic acoustical impedances. The dilational wave incident upon the interface is designated by reference numeral 24, and is propagated to the interface through a medium 26. The incident dilational wave 24 is considered as traveling parallel to the XY plane, and the interface between the adjacent media 26 and 28 is considered as lying in the YZ plane of the diagram. The angle of incidence is such that an angle $\alpha_1$ is formed by the wave 24 with the X axis which extends normal to the YZ plane or interface.

As is well known in geophysical technology, the incident dilational wave 24 results in the development of reflected and refracted dilational waves, 29 and 30, respectively, and also in a reflected distortion wave 32 and a refracted distortion wave 34. The angles at which the dilational waves 29 and 30 are reflected and refracted are designated by $\alpha_2$ and $\alpha_3$, respectively, while the reflected distortion wave is reflected at an angle $\beta_2$ and the refracted distortion wave is refracted at an angle $\beta_3$, all as measured with respect to the X axis.

The distribution of energies from the incoming dilational elastic wave 24 in the several reflected and refracted waves is discussed by Professor H. Kolsky in a monograph entitled "Stress Waves in Solids" published in 1963 by Dover Publications, Inc. At pages 24–36 of this work, the author describes the manner in which incoming dilational and distortional (compressional and transverse) waves impinging upon a boundary of a medium through which the wave is transmitted are reflected at such boundary. The discussion also considers the effect of impingement of an incoming elastic wave upon the interface or boundary between two media having different acoustic properties, i.e., different characteristic impedances. Since the effect of impingement of the dilational or compressional wave alone upon the interface between two media is of primary and overriding importance in considering the distribution of acoustic energy from a nuclear explosion of the type under consideration, that portion of the Kolsky treatise which appears from pages 31 to 34 of the monograph is of particular pertinence in understanding the theory of the present invention.

It is pointed out here that at an interface between two media, such as the formation and the material packed into the fractures 18, impingement of an elastic wave on the interface results in the generation of the four other waves which are referred to above. Two of these are refracted into the second media (in the case under consideration, into the material which fills the fracture), and two are reflected back into the first media which has been traversed by the incident wave in reaching the interface, i.e., the earthen environment of the fracture. By the recognized laws of geophysics and acoustics, four separate boundary or interface conditions must exist in this case.

First, in referring these to the diagram shown in FIG. 2, the normal displacement of a particle lying at the interface in either medium must be equal on both sides of the interface. In other words, displacements in the direction of the X axis on opposite sides of the interface due to the effect of the elastic wave on the particle must be equal. This equality Professor Kolsky indicates by the equation $$\sum u_a = \sum u_b \qquad (1)$$

where $u_a$ and $u_b$ are the displacements for the wave parallel to the X axis in the first and second media, respectively.

Second, the tangential displacements of such particles on opposite sides of the interface must be equal. By tangential displacements is meant displacements in the directions of the Y axis and the Z axis. This equality is written $$\sum v_a = \sum v_b \text{ and } \sum w_a = \sum w_b \qquad (2)$$

where $v_a$ and $v_b$ are the displacements for the wave parallel to the Y axis, and $w_a$ and $w_b$ are displacements for the wave parallel to the Z axis.

Third, the normal stress must be equal on both sides of the interface. This equation for this condition is $$\sum (\sigma_{xx})_a = \sum (\sigma_{xx})_b,$$

where $(\sigma_{xx})a$ is the normal stress in the medium 26 at the interface, and $(\sigma_{xx})b$ is the normal stress in the medium 28 at the interface. This equation may be more usefully written $$\sum \left( \lambda \Delta + 2\mu \frac{\partial u}{\partial x} \right)_a = \sum \left( \lambda \Delta + 2\mu \frac{\partial u}{\partial x} \right)_b \qquad (3)$$

where $u$ is the displacement value described above, $\lambda = \rho_a c_1^2 - 2\mu$ ($\rho_a c_1^2$ is equal the product of the density of medium 26 and the square of the velocity of waves 24 or 29 in this medium), $\mu = \rho_a c_2^2$ (the product of the density of medium 26 and the square of the velocity of distortion wave 32 in this medium); and $\Delta$ is given by $[\delta u/\delta x = \delta v/\delta y]$.

The last condition which must exist is that the tangential stress on opposite sides of the interface must be equal. From this equality, Kolsky develops the equations $$\sum \left[ \mu \left( \frac{\partial v}{\partial x} + \frac{\partial \mu}{\partial y} \right) \right]_a = \sum \left[ \mu \left( \frac{\partial v}{\partial x} + \frac{\partial u}{\partial y} \right) \right]_b$$

and $$\sum \left[ \mu \left( \frac{\partial w}{\partial x} + \frac{\partial u}{\partial z} \right) \right]_a = \sum \left[ \mu \left( \frac{\partial w}{\partial x} + \frac{\partial u}{\partial z} \right) \right]_b \quad (4)$$

When the incoming or impinging dilational wave is considered to be propagated in the XY plane, and to impinge upon the interface at a point where X equals 0, the recognized contributions of the five elastic waves to the several displacements which are identified in the four boundary or interface conditions described above permit four simultaneous equations to be developed if it is assumed that Huygens's principle is applied to the incident, reflected and refracted waves. When this assumption is made, the relation, applicable as in the case of light waves.

$$\sin\alpha_1/c_1 = \sin\alpha_2/c_1 = \sin\beta_2/c_2 = \sin\alpha_3/c_3 = \sin\beta_3/c_4 \quad (5)$$

can be utilized. In these relations, the angles have the designations which have been previously assigned, $c_1$ and $c_2$ are the velocities of propagation of dilation and distortion waves in the first medium, respectively, and $c_3$ and $c_4$ are the corresponding velocities in the second medium. If the amplitudes of the several waves 24, 29, 30, 32 and 34 are taken as $A_1$, $A_2$, $A_4$, $A_3$ and $A_5$, respectively, then by substitution in Equation (1–4), representing the four boundary conditions, there may be developed four equations which are as follows:

$$(A_1-A_2)\cos\alpha_1+A_3\sin\beta_2-A_4\cos\alpha_3-A_5\sin\beta_3 = 0 \quad (6)$$
$$(A_1+A_2)\sin\alpha_1+A_3\cos\beta_2-A_4\sin\alpha_3+A_5\cos\beta_3 = 0 \quad (7)$$
$$(A_1+A_2)c_1\cos 2\beta_2-A_3c_2\sin 2\beta_2-A_4c_3(\rho_b/\rho_a)\cos 2\beta_3-$$
$$-A_5c_4(\rho b/\rho a)\sin 2\beta_3=0; \text{ and} \quad (8)$$
$$\rho_a c_2{}^2[(A_1-A_2)\sin 2\alpha_1-A_3(c_1/c_2)\cos 2\beta_2]-$$
$$-\rho_b c_4{}^2[A_4(c_1/c_3)\sin 2\alpha_3-A_5(c_1/c_4)\cos 2\beta_3]=0 \quad (9)$$

where $\rho_a$ and $\rho_b$ are the densities of the two media 26 and 28 as hereinbefore stated.

By substituting in Equations (6–9) values from Equation (5), the four simultaneous equations which result may be solved to give the amplitudes of reflected and refracted waves in terms of the amplitude of the incident dilation wave. Thus, letting $$R_2 = \frac{A_2}{A_1}, \quad R_3 = \frac{A_3}{A_1}, \quad R_4 = \frac{A_4}{A_1} \text{ and } R_5 = \frac{A_5}{A_1},$$

and dividing each of Equations (6–9) by $A_1$, these equations become:

$$(1-R)\cos\alpha_1-R_3\sin\beta_2-R_4\cos\alpha_3-R_5\sin\beta_3 = 0 \quad (10)$$
$$(1+R_2)\sin\alpha_1+R_3\cos\beta_2-R_4\sin\alpha_3+R_5\cos\beta_3 = 0 \quad (11)$$
$$(1+R_2)c_1\cos 2\beta_2-R_3c_2\sin 2\beta_2-R_4c_3(\rho_b/\rho_a)\cos 2\beta_3-R_5c_4(\rho_b/\rho_a)\sin 2\beta_3 = <0 \quad (12)$$

and $$\rho_a c_2{}^2[(1-R_2)\sin 2\alpha_1-R_3(c_1/c_2)\cos 2\beta_2-$$
$$-\rho_b c_4{}^2[R_4(C_1/c_3)\sin 2\alpha_3-R_5(c_1/c_4)\cos 2\beta_3]=0 \quad (13)$$

From Equation (5), the following equations can be developed:

$$\sin\beta_2 = (c_2/c_1)\sin\alpha_1 \quad (14)$$
$$\sin\beta_3 = (c_4/c_1)\sin\alpha_1 \quad (15)$$
$$\sin\alpha_3 = (c_3/c_1)\sin\alpha_1 \quad (16)$$

Using Equations (14), (15) and (16), certain fundamental trigonometric identities can be utilized for obtaining trigonometric functions which can be solved when certain parameters are known.

Thus from Equation (16), $\cos\alpha_3 = (1-\sin^2\alpha_3)$ (17)
from Equation (14), $\cos\beta_2 = (1-\sin^2\beta_2)$ (18)
from Equation (15), $\cos\beta_3 = (1-\sin^2\beta_3)$ (19)
from Equation (18), $\cos 2\beta_2 = 2\cos^2\beta_2-1$ (20)
from Equation (14), $\sin 2\beta_2 = 2\sin\beta_2\cos\beta_2$ (21)
from Equation (19), $\cos 2\beta_3 = 2\cos^2\beta_3-1$ (22)
from Equation (15), $\sin 2\beta_3 = 2\sin\beta_3\cos\beta_3$ (23)
from Equation (16), $\sin 2\alpha_3 = 2\sin\alpha_3\cos\alpha_3$ (24)
and $\sin 2\alpha_1 = 2\sin\alpha_1\cos\alpha_1$ (25)

From these relationships, it may be seen that when $\alpha_1$ and $c_1$, $c_2$, $c_3$ and $c_4$ are known, Equations (14–25) can be solved, and the values obtained, along with measured values of $\rho_a$ and $\rho_b$ can be substituted in Equations (10), (11), (12) and (13) in order to solve these four equations. Solution in this manner will clearly indicate that the ratios of the amplitudes of the reflected dilational and distortion waves (such amplitudes being indicated by the terms $A_2$ and $A_3$) with respect to the incident dilational wave are at least comparable to the ratios of the amplitudes of the refracted waves to the amplitude of the incident dilational wave. Often, substantially more of the energy is reflected from the interface between the two media than is transmitted in the refracted elastic waves, and the primary object of the invention, i.e., the channeling of the acoustic energy in a desired direction is therefore effectively accomplished through the instrumentality of reflection.

In summary, it will be seen from the development of the mathematical expressions hereinbefore set forth in explanation of the underlying theory, that with a knowledge of the density of the two media (constituted by the packing in a fracture and the formation adjacent the fracture), the velocities of the elastic waves in these media, and the angle at which any elastic wave initiated by the explosion of the nuclear device impinges upon the interface between the media (angle of incidence), it may be shown that a substantial portion of the energy content of an acoustic wave generated by the nuclear explosion is reflected from the interface compared to that transmitted therethrough by refraction. Moreover, it will be apparent in referring to Equations 12 and 13, that the greater is the mismatch in the characteristic impedance ($\rho c$) between the media, the greater will be the amount of energy which is reflected in proportion to the amount which is transmitted by refraction through the fractures.

As an example of the manner in which the theoretical considerations corroborate the attainment of the primary object of the invention of channeling or focusing the energy from the nuclear explosion, in a certain limestone formation, the acoustic waves generated by the nuclear explosion have a velocity $c_1$ of 16,000 ft/second through the adjacent formation toward the interface formed between this formation and a horizontal fracture packed with a sand and water slurry selected to provide the necessary acoustic mismatch or characteristic impedance difference. In the packing material, the velocity ($c_3$) of the dilational elastic wave generated by the explosion is 5,000 ft/second. The velocity ($c_2$) of the reflected distortion wave in the first medium, i.e., the formation, is 10,000 ft/second as determined by measurement techniques well understood in the seismic technology. Finally, the velocity $c_4$ of the distortion wave in the packing material located in the fracture is determined to be 3,000 ft/second. Taking a point 36 along the interface of one of the fractures 18 with the adjacent formation, and considering an acoustic wave originating at point 38 at the locus of the explosion, the angle of incidence $\alpha_1$ of this wave 40 with respect to the interface is approximately 30°. The average density $\rho_b$ of the packing material is determined to be 2 grams/cc and the average density $\rho_a$ of the formation between the point 38 at the explosion situs, and the point 36 along the interface where the acoustic wave impinges, is 2.5 grams/cc. With the measurement of these values for the identified parameters, these values may then be used for solving Equations (14–16) and the fundamental trigonometric identities of Equations (17–25) so as to provide the following values:

$\sin\alpha_1 = 0.500$
$\sin\beta_2 = 0.294$
$\sin\beta_3 = 0.088$
$\sin\alpha_3 = 0.147$
$\cos\alpha_1 = 0.866$
$\cos\beta_2 = 0.950$
$\cos\beta_3 = 0.990$
$\cos\alpha_3 = 0.980$
$\cos 2\beta_2 = 0.800$
$\sin 2\beta_2 = 0.555$
$\cos 2\beta_3 = 0.980$ $\sin 2\beta_3 = 0.176$
$\cos 2\alpha_1 = 0.500$
$\sin 2\alpha_1 = 0.866$
$\sin 2\alpha_3 = 0.288$ The known values may then be substituted in Equations (10–13) to solve for the ratios $R_2$, $R_3$, $R_4$ and $R_5$. Solution of the four simultaneous equations for these four unknowns give
$R_2 = -0.39$
$R_3 = 0.58$
$R_4 = 1.45$, and
$R_5 = -0.65$ The amplitude of each wave is related to the intensity, I, or energy content of the wave by the equation $I = c\rho A^2 \cos\alpha$ (or $\beta$), where $\rho$ is the density of the medium traversed by the wave, $c$ is the velocity of the wave in that medium, $A$ is the amplitude of the wave, and the angle $\alpha$ or $\beta$ is the angle of wave to the X axis extending normal to the boundary or interface. By the law of conservation of energy, the total energy of the two reflected and the two refracted waves must be equivalent to the energy content of the incident dilational wave; or Intensity Incident on Interface = Reflected Intensity + Transmitted Intensity Using the amplitude expressions of intensity, this relationship may be written $$c_1\rho_a \cos\alpha_1 = [c_1\rho_a R_2^2\cos\alpha_2 + c_2\rho_a R_3^2\cos\beta_2] + [c_3\rho_b R_4^2\cos\alpha_3 + c_4\rho_b r_5^2\cos\beta_3]$$

Substitution of the known values in this equation yields $$1 = [0.15 + 0.22] + [0.56 + 0.07]$$

thus confirming the conservation of energy between incident, reflected and refracted waves, and showing that 15 percent of the energy of the incident dilational wave is reflected in dilational wave 29, 22 percent of this energy is reflected in the distortional wave 32, 56 percent of this energy is transmitted in the refracted dilational wave 30, and the remaining energy of 7 percent is transmitted in the refracted distortion wave 34.

It should be noted that where the fractures 18 are filled with a liquid, or a material which is at least partially liquid, the energy transmitted through the fracture via refracted waves is necessarily further reduced, since the transverse or distortional waves cannot be propagated through a fluid.

One effect of the channeling or focusing of the energy released by the nuclear device in the manner described is to concentrate this energy in a horizontal direction, where the fractures 18 are extended horizontally as shown. As a result of such concentration of energy, fracturing of the hydrocarbon bearing formation is extended to a much greater radial extent in a horizontal direction than would be the case were such focusing or directional control of the energy not employed. Thus, as shown in FIG. 4 of the drawings, fracturing extends outwardly for a number of cavity radii distance on opposite sides of the actual cavity developed by the detonation of the nuclear device, and this is to be contrasted with a much smaller extension of such fracturing where such method of controlling the direction of propagation of the released energy is not employed.

Although a preferred embodiment of the invention has been herein described in order to provide an example of its practice enabling those skilled in the art to follow the teachings of the invention, it is to be understood that various changes and modifications in the process parameters and steps involved may be effected without departure from the basic principles of the invention. Changes and innovations of this type are therefore deemed to be circumscribed by the spirit and scope of the invention except as the same may be necessarily limited by the appended claims or reasonable equivalents thereof.

What is claimed is:

1. A method of horizontally focusing energy in a subterrean formation comprising the steps of:
    a. drilling a bore hole from the surface of the earth downwardly through the formation in which the energy is to be focused;
    b. extending at least two vertically-spaced fractures radially and horizontally outwardly from the bore hole, each of said fractures extending radially outward therefrom a distance equal to at least twice the radius of the cavity formed by the subsequent detonation of the nuclear device as defined in step e) set forth hereafter;
    c. placing at least one material in each of the fractures which is different in its characteristic acoustic impedance from the characteristic acoustic impedance of the earth adjacent the fractures to form an acoustical block at the location of the fractures;
    d. positioning a nuclear explosive device within said bore hole adjacent the two vertically spaced fractures; and,
    e. detonating said nuclear device to form a cavity in the subterranean formation.

2. The method defined in claim 1 bearing each of said fractures extends a distance equal to at least three times the radius of said cavity formed by the detonation.

3. The method defined in claim 1 wherein the material of different characteristic acoustic impedance in said fractures has a thickness in said fractures of at least one-fourth inch.

4. The method defined in claim 1 wherein the material placed in said fractures has a characteristic acoustic impedance not exceeding about 600,000 grams/cm²sec.

5. The method defined in claim 1 wherein the material placed in said fractures is at least partially a liquid.

* * * * *